United States Patent

Finley

[11] 3,826,010
[45] July 30, 1974

[54] ADJUSTABLE INDICATOR GAGING UNIT
[75] Inventor: James Finley, Livonia, Mich.
[73] Assignee: Hanlo Gage and Engineering Company, Detroit, Mich.
[22] Filed: Feb. 28, 1973
[21] Appl. No.: 336,430

[52] U.S. Cl. ............................ 33/169 R, 33/172 R
[51] Int. Cl. ............................................. G01b 3/22
[58] Field of Search...... 33/172 R, 173, 169 R, 170, 33/171, 169 B, 143 H, 169 F, 169 D, 169 E, 162, 163, 199; 74/527

[56] References Cited
UNITED STATES PATENTS

| | | | |
|---|---|---|---|
| 2,435,268 | 10/1944 | Childs | 33/199 R |
| 2,546,513 | 3/1951 | Lovenston | 33/172 R |
| 2,661,539 | 12/1953 | Lovenston | 33/172 R |
| 2,883,755 | 4/1959 | Lovenston | 33/172 R |

Primary Examiner—Harry N. Haroian
Assistant Examiner—John W. Shepperd
Attorney, Agent, or Firm—Robert G. Mentag

[57] ABSTRACT

An indicator gaging unit having a body member with a mounting shaft at its upper end for operative attachment to an indicator gage. A vertical bore is formed through the body member and the mounting shaft. A gage pin is slidably mounted in said bore and has an upper end adapted for operative engagement by an indicator stem and a lower end adapted for operative engagement with a workpiece. The gage pin is provided with an angular bore therethrough which is disposed at an acute angle relative to the longitudinal axis of the gage pin. A pair of set screws are mounted transverse to the longitudinal axis of the gage pin and have cone ends which operatively engage the angular surface of said angular bore for adjusting the longitudinal movement of the gage pin.

4 Claims, 4 Drawing Figures

PATENTED JUL 30 1974 3,826,010

3,826,010

ADJUSTABLE INDICATOR GAGING UNIT

SUMMARY OF THE INVENTION

This invention relates generally to indicator gages, and more particularly, to a novel and improved indicator gaging unit having an adjustable gage pin.

Indicator gaging units have been provided heretofore with adjustable gage pins; however, the prior art gaging units incorporate complicated adjustable gaging pin structures. For example, some of the prior art gaging units must be disassembled to a certain extent so as to permit access to an adjusting screw positioned in the middle of the gaging pin. Other types of prior art gaging units employ balls in the adjusting means which rattle and make noise, and are complicated in structure and adjustment operation. In view of the foregoing, it is an important object of the present invention to provide a novel and improved gaging unit which overcomes the aforementioned disadvantages of the prior art gaging units.

It is another object to provide a gaging unit having an adjustable gage pin which is easy to adjust, simple and compact in construction and economical to manufacture.

It is still another object of the present invention to provide a novel and improved gaging unit which is provided with a gage pin that has a single angular bore formed therethrough which coacts with a pair of cone end set screws for adjusting and controlling the travel of the gage pin.

It is still another object of the present invention to provide a novel and improved gaging unit which includes a body member having a mounting shaft at its upper end for operative attachment to an indicator gage, a vertical bore extended through said body member and said mounting shaft, a gage pin slidably mounted in said bore and having an upper end adapted for operative engagement by an indicator stem and a lower end adapted for gaging contact with an object, said gage pin having an angular bore therethrough disposed at an acute angle relative to the longitudinal axis of the gage pin, and set screw means operatively mounted in said body member and adapted to engage the angular surface of said angular bore for adjustably limiting the upward and downward travel of the gage pin in said bore.

Other objects, features and advantages of this invention will be apparent from the following detailed description, appended claims, and the accompanying drawing.

DESCRIPTION OF THE PREFERRED EMBODIMENT

Figure 1:
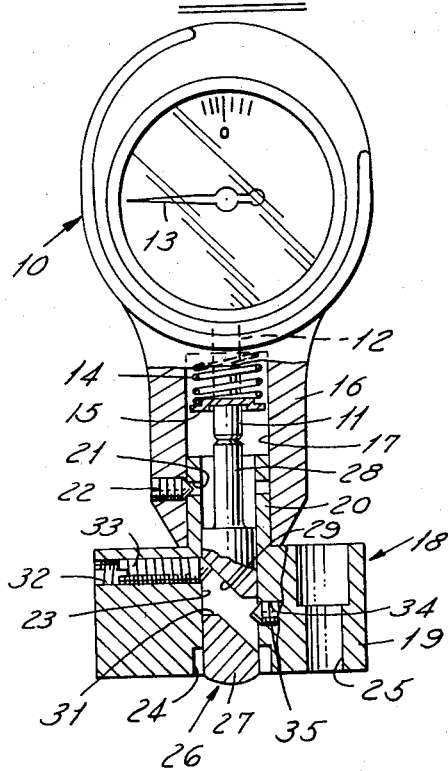
FIG. 1 is an elevational view, partly in section, of an adjustable indicator gaging unit made in accordance with the principles of the present invention.

Referring now to the drawing, and in particular to FIG. 1, the numeral 10 generally indicates a conventional dial indicator gage which is common in the art and well known to those skilled in the use of gages of this type and for which reason a detailed description of its manner of use is not required.

The numeral 11 designates the usual indicator stem which extends downwardly from the gage housing, through a bore 12, and which is operatively connected in the usual manner to an indicator pointer 13. The indicator 10 includes a downwardly extended support frame 16 in which is formed a longitudinally extended bore 17 which is open on its lower end. The indicator stem 11 extends downwardly into the bore 17 and is normally biased downwardly by a spring 14 which has its upper end abutting the closed upper end of the bore 17. The lower end of the spring 14 engages a spring retainer 15 that is fixed in a suitable manner to the indicator stem 11.

Operatively mounted on the lower end of the indicator gage support frame 16 is a gaging unit made in accordance with the principles of the present invention, and generally indicated by the numeral 18. As shown in FIG. 1, the gaging unit 18 includes a gaging adaptor body 19 which is substantially rectangular in overall configuration and which has integrally formed on its upper end a mounting shaft 20. The shaft 20 is slidably mounted in the lower end of the bore 17 in the indicator frame 16, and it is releasably secured in place in said bore 17 by a conventional set screw 22 which is a cone point set screw that has its inner end in engagement with a bore 21 formed transversely through the adaptor body shaft 20.

Figure 2:
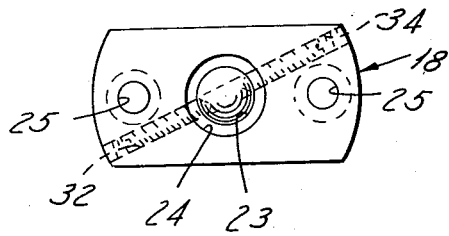
FIG. 2 is a bottom view of the structure illustrated in FIG. 1.

As shown in FIGS. 1 and 2, the gaging unit 18 is provided with a gaging pin vertical bore 23 that extends longitudinally through the adaptor body shaft 20 and through the body 19. The lower end of the gaging pin bore 23 is enlarged by a counter bore 24. Slidably mounted in the bore 23 is a gage pin, generally indicated by the numeral 26 (FIG. 1). The gage pin 26 includes a lower end portion 27 which has a spherically shaped lower end surface for engaging a workpiece. The gage pin 26 further includes an upper reduced end shaft 28 which is adapted to engage at its upper end the indicator stem 11. As illustrated in FIGS. 1 and 2, the gaging unit adaptor body 19 is provided with a pair of socket-head screw holes 25 for securing the gaging unit 18 in place.

Figure 3:
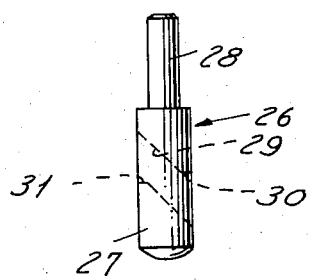
FIG. 3 is a front elevational view of the gaging pin employed in the structure of FIG. 1.
Figure 4:
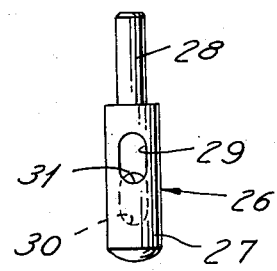
FIG. 4 is a left side view of the gaging pin structure illustrated in FIG. 3.

As shown in FIGS. 1 and 2, the gage pin 26 is provided with a bore 29 which extends through the lower end 27 at an acute angle from the longitudinal axis of the gage pin 26. As shown in FIG. 3, the lower end of the entrance hole on the left side of the bore 29 is provided with an inwardly extended transverse surface 31, and a similar surface 30 is formed on the upper end of the right side entrance hole of the bore 29. As shown in FIG. 1, the bore 29 coacts with an upper cone point set screw 33 for limiting the downward travel of the gage pin 26, and a second cone point set screw 35 for limiting the upward travel of the gage pin 26. The set screw 33 is mounted in a transverse threaded bore 32 formed in the upper end of the adaptor body 19. As shown in FIG. 1, the set screw 35 is threadably mounted in a transverse threaded bore 34 which is longitudinally spaced apart downwardly from the transverse threaded bore 32.

As shown in FIG. 2, the transverse bores 32 and 34 are in vertical alignment with each other. The angular bore 29 may be disposed at desired angles; however, a 45° angle is preferable. The screws 33 and 35 are adjusting screws that have their cone ends adapted to engage the mating angular surface of the bore 29. The cone ends of the screws 33 and 35 are disposed at 45° and accordingly, mate with the 45° surface of the bore 29. It is thus seen that with a single hole through the gage pin 26, it is possible to adjust and control the longitudinal movement of the pin 26 by setting the set screws 33 and 35 at a desired inwardly adjusted position. The amount of longitudinal adjustment for the gage pin 26 depends, of course, on the sizes of the various parts of the gage structure. For example, in one embodiment wherein the gage pin had a diameter of 0.3750 inch, a bore 29 formed with a No. 10 drill at a 45° angle, and with the set screws 33 and 35 being No. 10-32 screws and spaced 0.324 inch apart vertically, the plunger 26 had a full adjustment of 0.200 inch. It will be understood that the aforementioned embodiment was adjustable within the 0.200 inch range by merely threading the set screws 33 and 35 inwardly and outwardly, as desired, to provide different coacting positions of the cone ends or noses of the set screws relative to the angular surface of the bore 29. It will also be seen that the adjustment screws 33 and 35 function as over-travel protection means to protect the indicator 10 from over-travel. The cone ends of the set screws 33 and 35 operate against the angular surface of the bore 29 in a cam-like action for adjusting the limits of travel of the plunger pin 26. If less adjustment is required, then when using a 45° angle for the bore 29, a different angle can be used, as for example, a 60° angle from the vertical, or conversely, a 30° angle from the transverse axis.

The gaging unit of the present invention is simple in construction and economical to manufacture because of the minimum number of parts. It is also easy to adjust because of the simplicity of construction.

While it will be apparent that the preferred embodiment of the invention herein disclosed is well calculated to fulfill the objects above stated, it will be appreciated that the invention is susceptible to modification, variation and change.

What is claimed is:
1. An indicator gaging unit comprising:
   a. a body member for operative attachment to an indicator gage;
   b. a vertical bore extended through said body member;
   c. a gage pin slidably mounted in said bore and having an upper end adapted for operative engagement by an indicator stem and a lower end adapted for gaging contact with an object;
   d. said gage pin having an angular bore therethrough disposed at an acute angle relative to the longitudinal axis of the gage pin; and,
   e. set screw means operatively mounted in said body member and adapted to engage the angular surface of said bore for adjustably limiting the upward and downward travel of the gage pin in said bore and for moving the gage pin to adjust the initial position of the indicator stem so that the indicator gage reads zero.

2. An indicator gaging unit as defined in claim 1, wherein:
   a. said set screw means includes a pair of set screws spaced apart along the longitudinal axis of the gage pin and having their inner ends operatively engaged with the angular surface of said angular bore in said gage pin.

3. An indicator gaging unit as defined in claim 2, wherein:
   a. each of said set screws has a cone end operatively engaged with said bore angular surface.

4. An indicator gaging unit as defined in claim 2, wherein:
   a. said set screws are vertically aligned.

* * * * *